No. 626,730. Patented June 13, 1899.
C. A. SOUTHWICK.
AUTOMATIC WATER FEEDER.
(Application filed Oct. 8, 1898.)

(No Model.) 2 Sheets—Sheet 1.

WITNESSES
A. J. Ponney.
A. J. Ponney.

INVENTOR
Charles A. Southwick,
By his Atty.
Perry W. Williams

No. 626,730. Patented June 13, 1899.
C. A. SOUTHWICK.
AUTOMATIC WATER FEEDER.
(Application filed Oct. 8, 1898.)

(No Model.) 2 Sheets—Sheet 2.

WITNESSES INVENTOR

UNITED STATES PATENT OFFICE.

CHARLES A. SOUTHWICK, OF PEABODY, MASSACHUSETTS.

AUTOMATIC WATER-FEEDER.

SPECIFICATION forming part of Letters Patent No. 626,730, dated June 13, 1899.

Application filed October 8, 1898. Serial No. 693,001. (No model.)

*To all whom it may concern:*

Be it known that I, CHARLES A. SOUTHWICK, a citizen of the United States, residing in Peabody, in the county of Essex and State of Massachusetts, have invented new and useful Improvements in Automatic Water-Feeders, of which the following is a specification.

This invention relates to automatic water-feeders of the class to which my Letters Patent, numbered 518,866, granted April 24, 1894, belong, for the purpose of maintaining a standard level for water or other liquid in steam-boilers, tanks, &c.; and it consists in a certain improved construction whereby a greater efficiency and durability are secured and repairs rendered practicable and easy, especially in connection with the valve and valve-seat at the steam-inlet, without removing the large piping and levers in the device.

Figure 1:
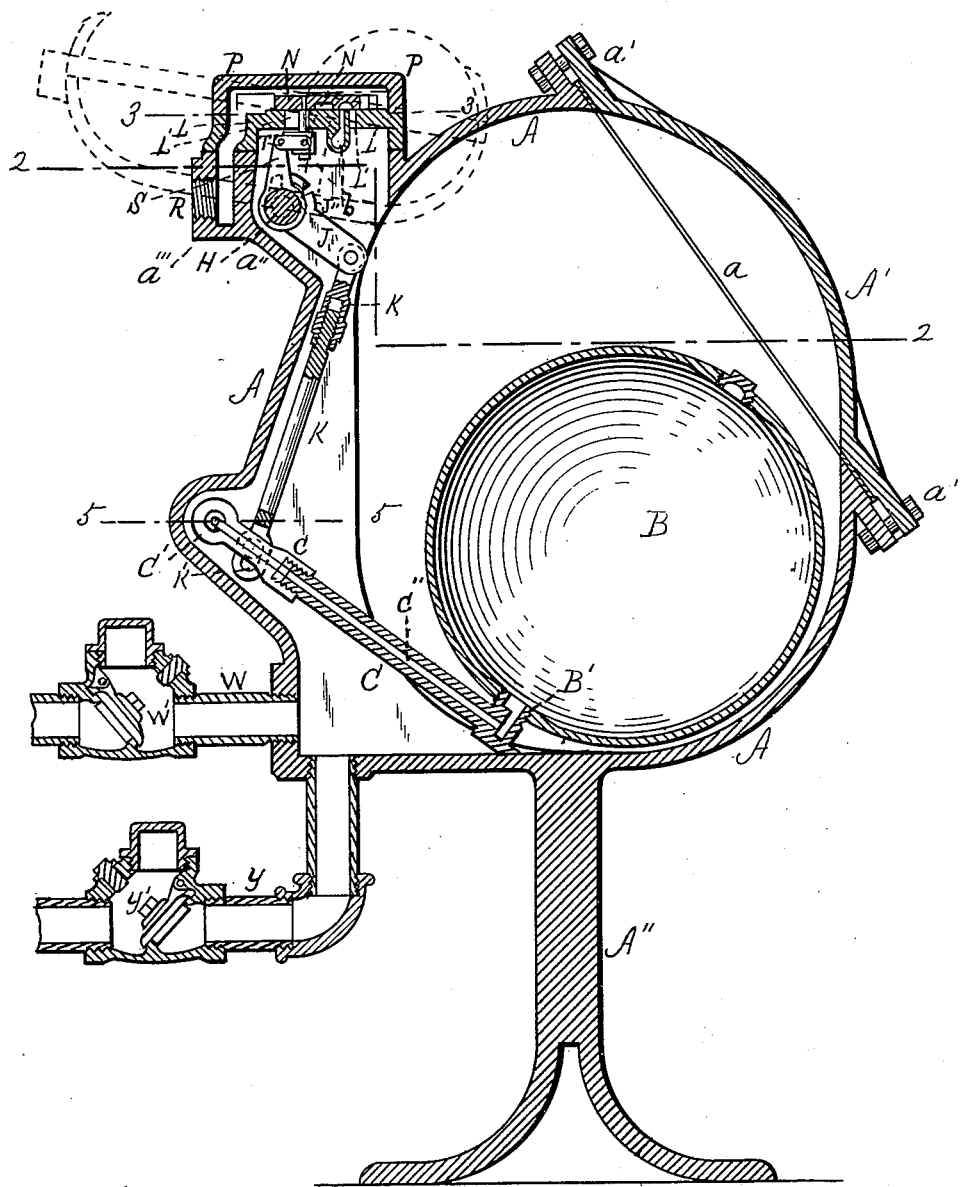
Figure 2:
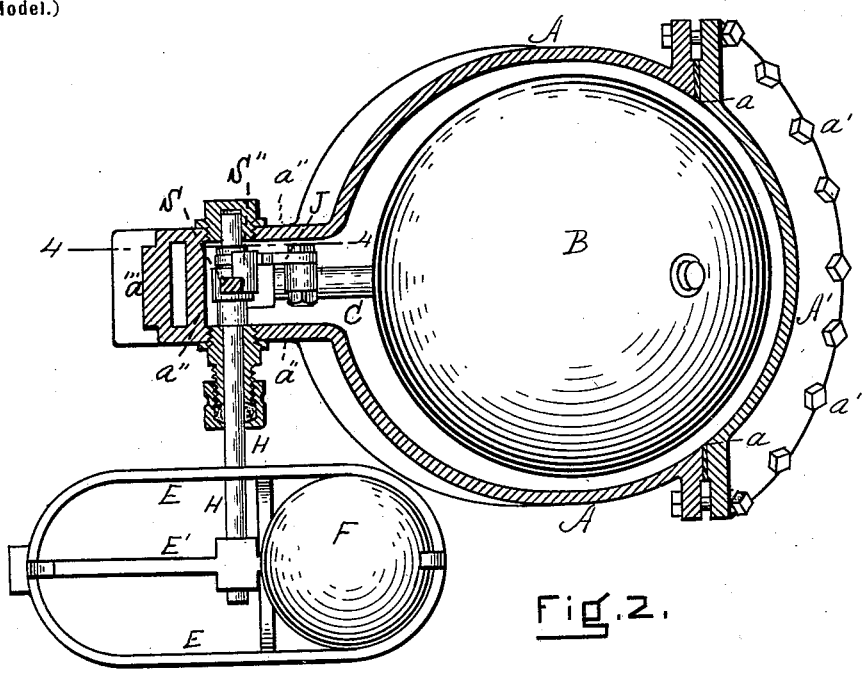
Figures 3, 4, 5:
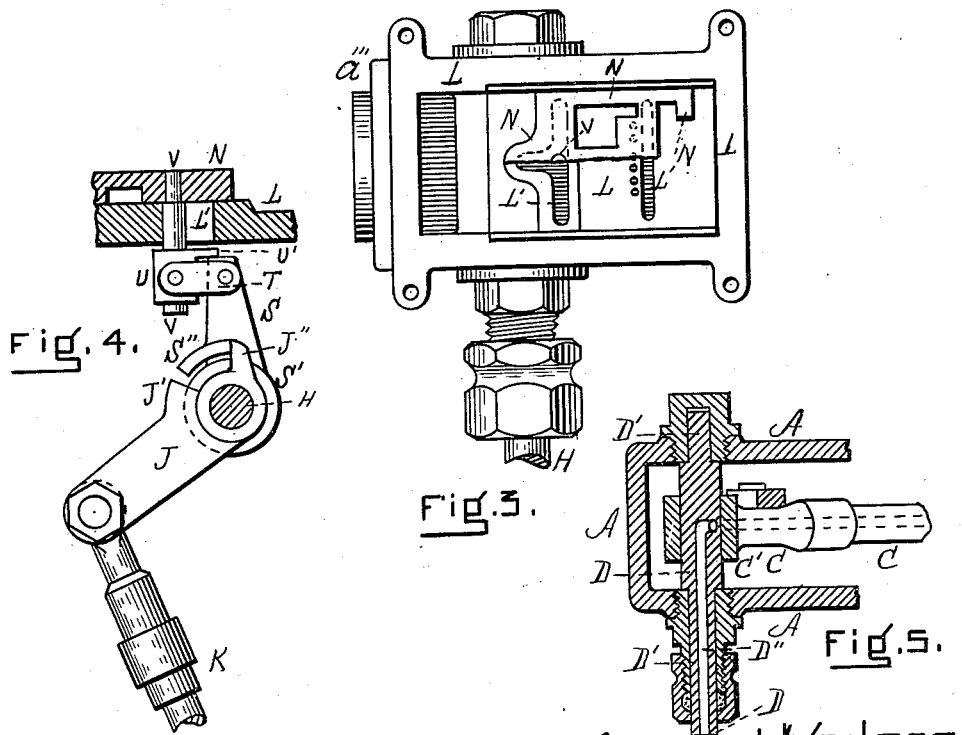

In the accompanying drawings, in which similar letters of reference indicate corresponding parts, Figure 1 represents a vertical section of my improved feeder, the position of the tilting frame being indicated by broken lines. Fig. 2 is a section taken on line 2, Fig. 1. Fig. 3 is an enlarged section taken on line 3, Fig. 1, with the cap removed and a portion of the valve represented as broken out. Fig. 4 is a sectional detail on line 4, Fig. 2, looking toward the front. Fig. 5 is an enlarged horizontal section taken on line 5, Fig. 1.

The feed-reservoir A A' is a closed vessel divided at $a$ into two parts bolted together, as shown at $a'$, so that the part A' can be removed. It will be noticed that in this invention the reservoir is not divided into two equal parts; but the division is so made that the part A' is much the smaller, being only large enough to allow of the removal of the float. By this means the number of bolts $a'$ required is lessened and the danger of leakage diminished. The reservoir is supported by a suitable standard A''.

B is a float. Its interior is connected by the tube B', Fig. 1, with the hollow lever C, whose hub C', Figs. 1 and 5, is fast on the hollow axle D, having its bearings at D' in the portion A of the reservoir. The passage C'' in the lever C connects through the hub C' with the passage D'' in the axle D, and the outer end of the latter passage leads to the external air. By means of this construction any water or steam leaking into the float can flow out by gravity when the float is in a raised position.

A tilting frame constructed as usual comprises the side rails E and lower bar E' and contains the freely-rolling ball F, and this tilting frame is supported by and rigidly connected with the shaft H, having its bearings in the portion $a''$ of the reservoir. An arm J, Figs. 1 and 4, is integral with and extends from the shaft H and is pivotally connected at its outer or lower end with the upper end of a link K, whose lower end is loosely connected by means of the slot K' and a suitable pin with the hollow lever C, as shown.

The portion $a''$ of the reservoir constitutes a valve-shell and supports the removable valve-seat L, which is provided with ports L'. Resting and adapted to slide on this seat is the valve N, formed with the ports N', and removably supported by the valve-seat L and the extension $a'''$ of the part $a''$ is the cap P.

R is the steam-inlet, and $b$ an exhaust opening into the atmosphere. The interior of the part $a''$ opens into the main portion of the reservoir A A'. Loose on the shaft H is a sleeve S', Figs. 3 and 4, from which extends an arm S, whose upper end is pivotally connected by a link T with a sleeve U, which is loose on a vertical rod V, extending up through one of the ports in the valve-seat to the valve N. A horizontal projection U' extends from the sleeve U over the upper end of the arm S. The lower portion of the arm S is provided with an arc-shaped projection S'', which extends between two engaging teeth or lugs J' J'' on the arm J.

W represents the water-inlet, provided with the valve W', and Y is the water-outlet, provided with the valve Y'.

In practical operation the water enters through the inlet W, lifting the valve W', and passes into the reservoir, raising the float B. As the float rises it swings up the hollow lever C and lifts the link or rod K, swinging up the arm J and rotating the shaft H. The rotation of the shaft tilts the frame E E', and the ball F therein rolls to the left and assists the movement of the parts in the usual manner. When the arm J is swung up, as above described, the tooth J' engages the projection S'' and swings the arm S, which by means of the link T and sleeve U moves the pin V and slides the valve N, opening the ports L' N' and closing the exhaust b, thus admitting steam from the inlet R to the reservoir. When the ball falls, the reverse happens, the shaft H being rotated in the opposite direction, with the effect of closing the ports, the tooth J" acting on the projection S" and the water passing out through the outlet Y, lifting the valve Y'. The finger or projection U' prevents the sleeve V and the link T from dropping and accommodates itself to the movement of the upper end of the arm S, which describes an arc.

It will readily be seen that when the valve or valve-seat becomes cut or worn it is a simple matter to remove the cap P and take out either valve or valve-seat without disturbing the pipes or levers, as is necessarily the case in my invention described in the Letters Patent above referred to.

Having thus fully described my invention, what I claim, and desire to secure by Letters Patent, is—

1. In an automatic water-feeder, the combination of the reservoir formed with the valve-shell $a''$ containing the sliding valve N and valve-seat L each provided with suitable ports, the valve-shell being provided with a steam-inlet and cap; the shaft H supported by the frame; the arm S loose on said shaft and extending upward therefrom; a pin extending downward from the valve through one of the ports of the seat; a connection between the free end of the arm S and the pin; the arm J fast on said shaft and swinging downward therefrom; the rod or link K pivotally secured at its upper end to said arm J; the float B; and a lever one end of which is secured to the float and the other pivotally connected with the frame, said rod or link K being loosely connected with said lever, and said arm J engaging the arm S by means of suitable teeth J, J' on the former and a projection S" on the latter, substantially as described.

2. In an automatic water-feeder, the combination of the reservoir formed with the valve-shell $a''$ containing the sliding valve N and valve-seat L each provided with suitable ports; the pin V extending from said valve downward through one of the ports in the valve-seat; the sleeve U on said pin below the valve-seat; the shaft H supported in the frame; the arm S loose on and extending upward from said shaft; the link T connecting the upper end of said arm with the sleeve U, said sleeve being provided with the finger U' extending over the upper end of the arm whereby the sleeve and link are prevented from dropping and provision is made for the arc-shaped movement of the upper end of the arm; the arm J rigid with said shaft and adapted to engage said arm S; the float B; and mechanism intermediate of the arm J and float whereby said arm is swung up as the float rises, substantially as set forth.

CHARLES A. SOUTHWICK.

Witnesses:
HENRY W. WILLIAMS,
A. N. BONNEY.